United States Patent [19]

Stroupe

[11] 4,144,632
[45] Mar. 20, 1979

[54] METHOD OF MAKING TUBULAR ARTICLE

[75] Inventor: James D. Stroupe, Newtown, Pa.

[73] Assignee: Sipler Plastics, Inc., Doylestown, Pa.

[21] Appl. No.: 921,475

[22] Filed: Jul. 3, 1978

Related U.S. Application Data

[60] Continuation-in-part of Ser. No. 760,243, Jan. 17, 1977, abandoned, which is a division of Ser. No. 454,302, Mar. 25, 1974, abandoned.

[51] Int. Cl.$^2$ .................. B29D 3/00; B29D 23/10; B29C 1/12
[52] U.S. Cl. .................. 29/469.5; 156/156; 156/165; 156/191; 156/194; 264/257; 264/263; 264/267; 264/269; 264/314
[58] Field of Search .............. 264/314, 257, 258, 259, 264/267, 269, 263; 156/165, 191, 194, 195, 156; 29/469.5

[56] References Cited

U.S. PATENT DOCUMENTS

| | | | |
|---|---|---|---|
| 1,504,547 | 8/1924 | Egerton | 264/314 |
| 2,723,426 | 11/1955 | Pelley | 264/314 |
| 2,995,781 | 8/1961 | Sipler | 264/314 |
| 3,270,111 | 8/1966 | Haldeman | 264/314 |
| 3,755,037 | 8/1973 | Erwin et al. | 264/314 |

Primary Examiner—W.E. Hoag
Attorney, Agent, or Firm—Zachary T. Wobensmith, 2nd; Zachary T. Wobensmith, III

[57] ABSTRACT

A one-step method of both making and tortuously shaping three component tubular articles is disclosed, the tubular articles being of the hollow skin-core type of the desired complex configuration, strong and rigid, free from porosity, light in weight, resistant to high and low temperatures, comprised of a thin and relatively fragile elongated and longitudinally edge-lapped sheet tube integrally encased in a strongly reinforced plastic shell providing both tube-forming support and tube performance protection for fluid conveying and storage applications. The tube-forming sheet can be of specialized rubbers or plastics or metallic foils. It is advantageously susceptible to inspection to the required degree before incorporation into the article and may be capable of subsequent in place modification. It is gently formed under the controlled restraint of the combination of its surrounding rib-knit fabric tubes and flowing viscous resin in a tortuously shaped mold by an inflatable mandrel in a single step low pressure operation.

2 Claims, 19 Drawing Figures

FIG./
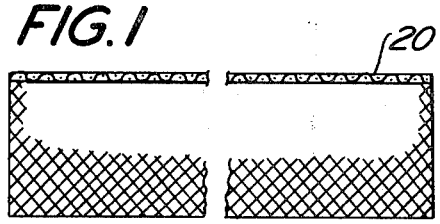
FIG.2A
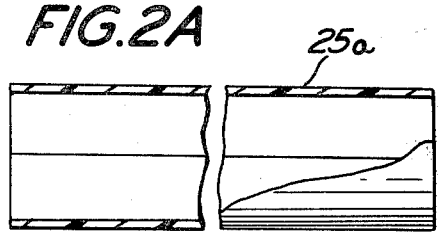
FIG.2B
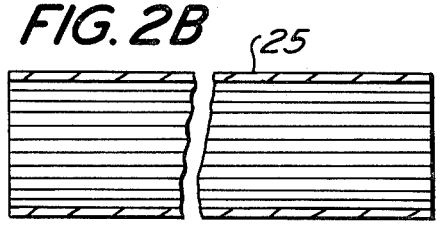
FIG.2C
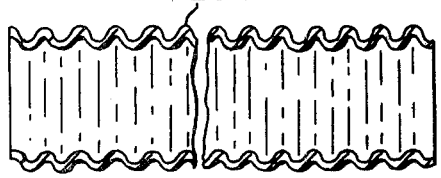
FIG.2D
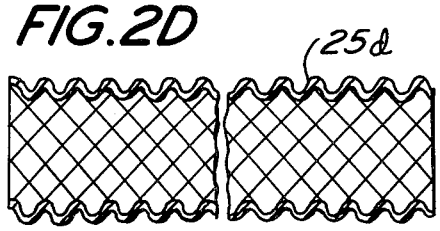
FIG.2E
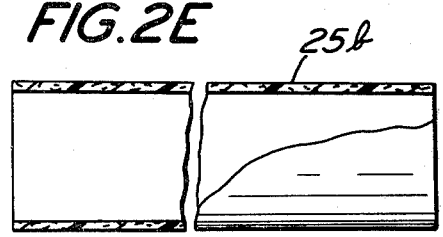
FIG.2F
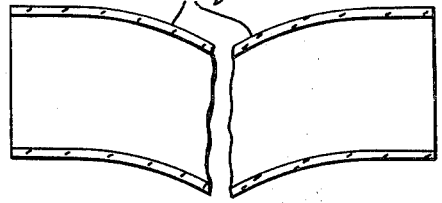
FIG.3B
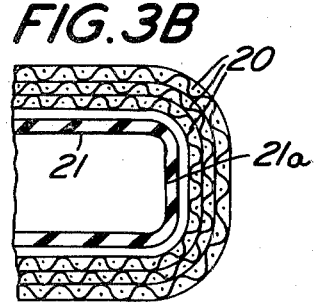
FIG.3
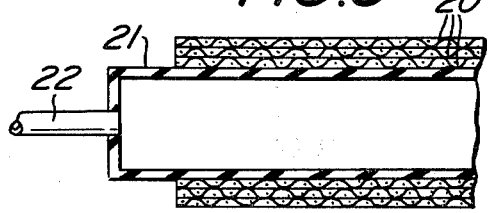
FIG.3A
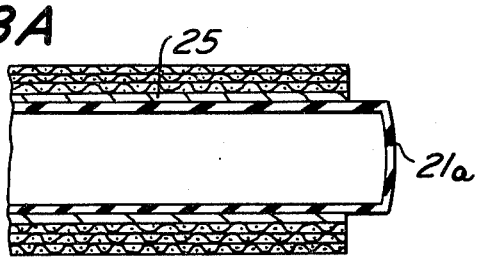

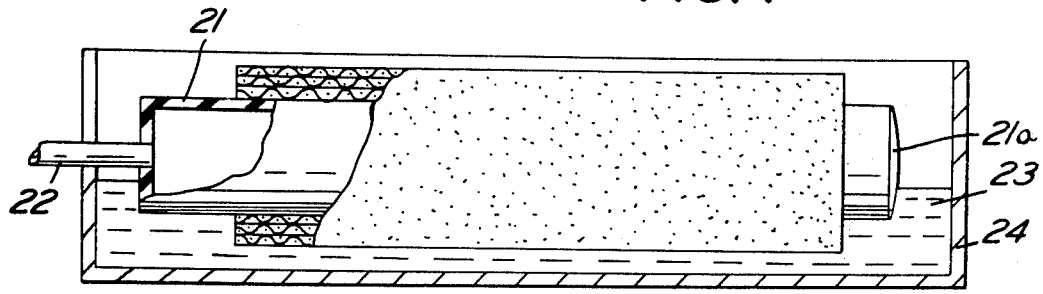
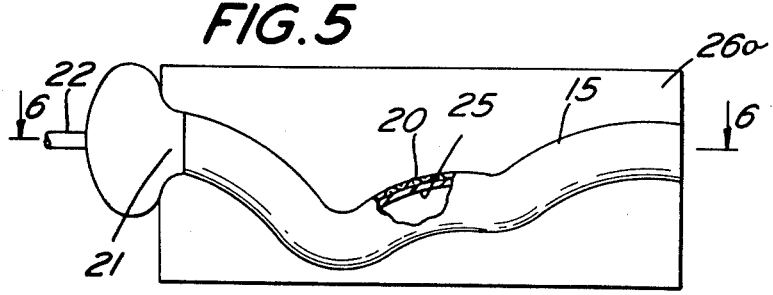
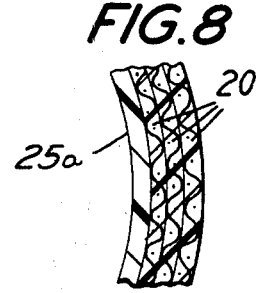
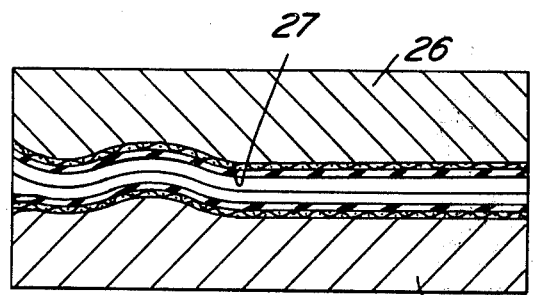
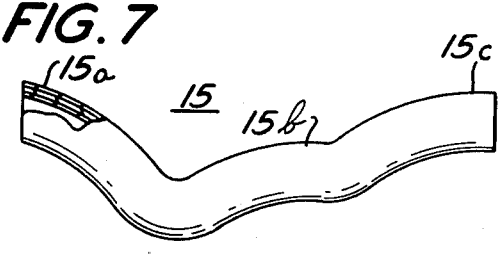
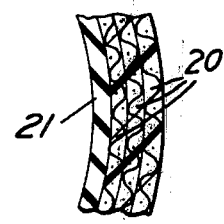
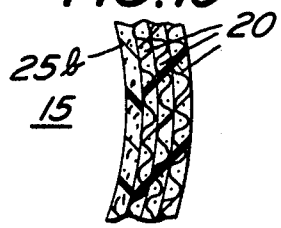
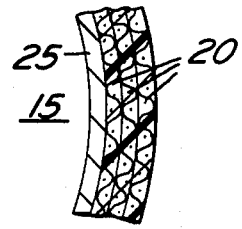
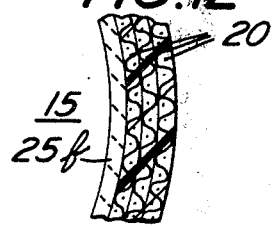

METHOD OF MAKING TUBULAR ARTICLE

CROSS REFERENCE TO RELATED APPLICATIONS

This application is a continuation in part of my prior application filed Jan. 17, 1977, Ser. No. 760,243, which is a division of my application filed Mar. 25, 1974, Ser. No. 454,302 both being now abandoned.

BACKGROUND OF THE INVENTION

1. Field of the Invention

This invention relates to methods of making armored tubular articles and more particularly to making rigid tortuously shaped armoured tubular articles suitable for safe conveyance of flowing gases or liquids under pressure or vacuum or for fluid storage.

2. Description of the Prior Art

A considerable variety of multiple step, multiple component methods are practiced for the making of simply shaped armored tubing. They include the winding of protective filament shells on preformed liners and the simultaneous wire braiding of extruded tubing in their most sophisticated development from many simpler methods for providing the advantages of specialized lining components in strengthening shells.

It has heretofore been proposed in the Sipler, U.S. Pat. Nos. 2,990,885 and 2,995,781 to provide tubular conduits and methods of making the same which utilize the mechanical interactions between an inflatable madrel and a surrounding knitted fabric resin carrying component to produce monolithic permanently shaped strong non-porous tube like objects by a low pressure molding operation self-stopped by setting of the resin, the fabric being retained in the body of the finished article to contribute to the performance of the finished conduit, the inflatable mandrel being removed for reuse. Except for intended reuse of the mandrel the Sipler disclosures do not recognize that the restraint of the surrounding fabric tubes importantly operates to minimize mandrel blow outs.

Such conduits have been extensively used in the automotive field on trucks for connecting air cleaners to carburetors and for other purposes and are tailored by choice of resin, filler and reinforcement so that each unit volume contributes substantially equally to the performance of the article.

SUMMARY OF THE INVENTION

In accordance with the invention, thin and fragile free sheet components are both shaped into edge overlapped tubes of tortuous configuration and permanently integrated to similarly and simultaneously shaped rib knit fabric tube reinforced outer plastic shells in a one step inflatable mandrel molding operation. The sheet components advantageously include many materials having limited inherent stretchability but utilizable bendability, such as metallic foils, thin or only partially cured rubbers and a wide variety of thermoplastic polymers.

The principal object of the invention is to provide methods of making permanently shaped, integrally and rigidly armored and tortuously shaped tubular articles of a wide variety of bendable sheet materials having limited stretchability.

It is a further object of the invention to provide a simple single step method for forming such articles utilizing the mechanical interactions between the overlapped sheet component, its inflatable mandrel and its surrounding rib-knit fabric and congealing viscous resin combination.

It is a further object of the invention to provide a method of utilizing sheet components which can be precorrugated or wrinkled to increase their tortuous formability and to insure against tearing.

It is a further object of the invention to provide a method of utilizing sheet components which are susceptible to physical inspection before forming and may be capable of advantageous in-place chemical modification.

Other objects and advantageous features of the invention will be apparent from the description and the claims.

BRIEF DESCRIPTION OF THE DRAWINGS

The nature and characteristic features of the invention will be more readily understood from the following description, taken in connection with the accompanying drawings forming part thereof, in which:

FIG. 1 is a view in elevation of one of the stretchable knitted fabric resin carrying components employed in connection with the invention;

FIG. 2A is a fragmentary view partly in section and partly in elevation of a tube forming component employed in connection with the invention;

FIG. 2B is a fragmentary view similar to FIG. 2A, partly in section and partly in elevation of another tube forming component employed in connection with the invention;

FIG. 2C is a fragmentary view, similar to FIG. 2A, partly in section and partly in elevation of another tube forming component employed in connection with the invention;

FIG. 2D is a fragmentary view, similar to FIG. 2A, partly in section and partly in elevation of another tube forming component employed in connection with the invention;

FIG. 2E is a fragmentary view, similar to FIG. 2A, partly in section and partly in elevation of another tube forming component employed in connection with the invention;

FIG. 2F is a fragmentary view, similar to FIG. 2A, partly in section and partly in elevation of another tube forming component employed in connection with the invention;

FIG. 3 is a view in elevation of the inflatable mandrel with the knitted fabric applied thereto and in which the mandrel may provide a tube forming component;

FIG. 3A is a view similar to FIG. 3 in which the mandrel carries tube forming components;

FIG 3B is a view similar to FIG. 3 for a closed end tubular article;

FIG. 4 is a vertical section view showing the resin applying step in the formation of the protective shell;

FIG. 5 is a horizontal sectional view taken approximately on the line 5—5 of FIG. 6 and showing further steps in the production of the article;

FIG. 6 is a vertical sectional view taken approximately on the line 6—6 of FIG. 5;

FIG. 7 is a view partly in elevation and partly in section showing an article in accordance with the invention;

FIG. 8 is an enlarged fragmentary sectional view of a portion of the wall of an article in accordance with the invention;

FIG. 9 is a view similar to FIG. 8 showing another construction;

FIG. 10 is a view similar to FIG. 8 showing another construction;

FIG. 11 is a view similar to FIG. 8 showing another construction; and

FIG. 12 is a view similar to FIG. 8 showing another construction.

It should, of course, be understood that the description and drawings herein are illustrative merely, and that various modifications and changes can be made in the structure and methods disclosed without departing from the spirit of the invention.

Like numerals refer to like parts throughout the several views.

DESCRIPTION OF THE PREFERRED EMBODIMENTS

Referring now more particularly to FIGS. 5 to 12, inclusive, of the drawings, a continuous integral rigid hollow tubular article 15 in accordance with the invention is there illustrated and includes an end section 15a, a curved intermediate section 15b with its axis curved or angled and in a plurality of planes from which an end section 15c extends preferably relatively straight and open ended if desired. While the sections 15a, b and c are generally circular cylindrical and of varying transverse cross section as required for a particular end use the longitudinal axis is usually a tortuous line in a multiplicity of planes.

The shape shown in FIG. 7 is merely illustrative of various complexly curved articles which can be made in the practice of the invention.

The mode of making the article 15 will now be pointed out.

Referring now to FIG. 1 of the drawings, one of the components of the invention is illustrated at 20 and preferably consists of a continuous seamless knitted tubular fabric, closed ended if desired, preferably rib-knit, so as to be circumferentially expansible and upon expansion free from any tendency to thin out appreciably. While the extent of circumferential expansibility of the knitted tube 20 can be varied, the expansibility is preferably of an order up to about 800%. Any suitable materials for this purpose can be employed, dependent on the degree of heat resistance required. For normal low temperature ranges of the order of 250° F., and suitable for many automotive conduits, cotton or rayon, and nylon, Dacron, or other thermoplastic yarns can be employed for the making of the knitted tube 20.

If a higher order of temperature resistance is required, say up to 500° F., it is preferred that the knitted tube 20 be made of yarns of glass fibers or asbestos.

It is also feasible to use yarns having mixtures of the filamentary materials referred to, or strands of different materials can be employed on different carriers, or needles, in knitting the fabric.

For certain purposes, also a plurality of knitted tubes 20, each with the yarns of different materials can be employed as hereinafter explained. The texture of such knitted tubes 20 can be varied, if desired.

An inflatable cylindrical mandrel or core tube 21 is provided, closed at one end 21a (see FIG. 3) and at the other end has a valved inlet connection 22. The core tube 21 is preferably of rubber, natural or synthetic, and of a thickness of the type ordinarily used for inner tubes for tires of automotive vehicles.

The tube forming material is shown generally at 25 and is placed on the core tube 21 which is in substantially deflated condition. A plurality of knitted tubes 20 are placed exteriorly on the core tube 21 in enclosing relation as shown in FIGS. 3, 3A and 3B.

The tube forming materials because of their relatively fragile nature may require suitable handling.

For all tube formers, including thick polyethlene, metal foil or the like, the core tube 21 serves as a mandrel. By way of illustration FIG. 2A illustrates a non-stretchable component 25a of synthetic plastic sheet material. Such a sheet, which by way of example can be a clear polyethylene sheet of a thickness of 10 mils, is wrapped around a core tube 21 which has been coated with talcum powder to facilitate slippage upon radial expansion of the core tube 21 and with a longitudinal streak of black gel coat for sealing overlapping surfaces.

The tube formers, if of other sheet plastic or of metal foil, can be similarly handled and trimmed to shape.

Preliminary preparation of certain types of tube forming sheet material can also be employed. A relatively inexpansible but bendable sheet material 25c can be provided with longitudinal ribs as illustrated in FIG. 2B, or of non-stretchable material 25d with transverse ribs as illustrated in FIG. 2C or of non-stretchable material 25e with both longitudinal and transverse ribs as illustrated in FIG. 2D to accommodate expansion as required.

The tube formers heretofore referred to are susceptible to inspection prior to insertion and remain relatively unchanged except as to shape by the molding and curing process.

In place post curing can be advantageously employed with some tube formers, such as those a partially cured rubber sheet.

In each case the tube former 25 on the core tube 21 is inserted lengthwise within a plurality of knitted tubes 20 as shown is FIGS. 3 and 3A. At this time, if desired, a partial inflation of the core tube 21 can be effected, but this is not usually required.

The core tube 21 with one or more knitted tubes 20 thereon is then dipped into a suitable liquid resin 23 in a receptacle 24 so that the knitted tubes 20 can be covered with and carry the liquid resin 23.

The resin 23 can be of any suitable type, is preferably of the thermosetting type and can be a phenolic resin, a silicone resin, or a polyester resin, with suitable catalysts and curing agents incorporated therein and of suitable viscosity for application to the knitted tubes 20 and for subsequent treatment, and can be such as are described in the Sipler U.S. Pat. Nos. 2,990,855 and 2,995,781.

In order to determine the exterior shape of the article 15 a mold is provided and while any preferred form of mold can be employed, as shown in FIGS. 5 and 6 it is preferred to use a metallic mold of two or more separate parts 26 and 26a having an interior cavity 27 of the desired shape to be provided on the finished article. The interior cavity 27 can be cast therein by employing a master or pattern (not shown) and the surface thereof does not require any high quality finish.

After assembly of the tube former 25, the fabric component 20, and mandrel or core tube 21 in the mold cavity 27, the mold 26 is closed and clamped in closed position.

The core tube 21 is then inflated to apply an internal pressure which may be of the order of 50 p.s.i. The application of the pressure by the core tube 21 causes the fabric of the knitted tubes 20 to extend radially and circumferentially and to shape itself to the shape determined by the shape of cavity 27.

The tube former 25 of rubber, neoprene, or synthetic plastic or metallic foil is initially wrapped onto the core tube 21 as in FIGS. 2A or 2E. The tube former 25 slips circumferentially and is forced in sheet form against the interior of the surrounding fabric components for subsequent bonding thereto.

When the tube former 25 is corrugated or ribbed as in FIGS. 2B, 2C or 2D, the internal application of pressure causes a stretching and flattening.

The liquid resin is caused to impregnate the interstices between the yarns of the knitted tube or tubes 20 and the interstices between the fibers of the yarn and engage the exterior surface of the tube former 25, excess resin escaping at the mold lines.

The article can then be heat cured in the mold 20, or can be removed from the mold 20 and post treated as required or desired to maximize its available properties.

The article 15 is then ready for use.

The article thus provided comprises a fragile tube protected by a rigid shell. The tube preferably is selected to be impermeable by the contained fluid, is preferably non-corrosible and inert and to remain so with no transfer or contaminants to the contained fluid, whether liquid or gas. Tube formers having known impenatrability by specific fluids can be employed.

The use of metallic foils for tube formers also reduces heat transfer inwardly or outwardly.

Specialized tube formers of high unit cost are effectively supported by resin attachment to the surrounding structure.

In FIG. 8 a portion of an article in accordance with the invention is illustrated in which the tube former 25a is of synthetic plastic, while in FIG. 9 a tube former of rubber 21 is shown.

In FIG. 11 a tube former 25 of metal such as foil is illustrated.

The articles heretofore described, if used as storage containers, can be given peculiar shapes to serve as tanks for trailers, campers, or air or land vehicles as well as having high resistance to corrosion and tendency to leakage.

I claim:

1. The method of making a unitary hollow rigid tubular article having a fixed tortuous non-planar longitudinal configuration with a smooth interior and a variable cross sectional area along the length thereof which comprises:

wrapping a flexible sheet of corrugated metal foil on an expansible and flexible core tube of elastic material, superposing an elongated circumferentially expansible seamless knitted fabric tube over said foil, applying a thermosetting resin compatible with said fabric and the metal foil to the exterior of the fabric tube, inserting the core tube with said corrugated foil, said tube and said resin into an elongated smooth cavity in a mold, which cavity has a fixed tortuous non-planar longitudinal axis and a variable cross sectional area along said axis and is shaped to conform to the finished shape of the article, expanding the core tube and shaping the corrugated metal under the restraint of the expanding resin carrying fabric tube to conform to the elongated mold cavity by pressure applied in the core tube and by the expansion forcing the resin into the interstices of the fabric into contact with the corrugated metal and adhering said fabric to said metal by said resin, curing the resin, and removing the core tube, thereby forming said article.

2. The method defined in claim 1 in which said tube former is a circumferentially overlapping free sheet.

* * * * *

UNITED STATES PATENT OFFICE
CERTIFICATE OF CORRECTION

Patent No. 4,144,632            Dated March 20, 1979

Inventor(s) James D. Stroupe

It is certified that error appears in the above-identified patent and that said Letters Patent are hereby corrected as shown below:

Column 1,

Line 28, after "Nos.", "2,990,885" should be — 2,990,855 — .

*Signed and Sealed this*

*Twenty-second* Day of *May 1979*

[SEAL]

Attest:

RUTH C. MASON
*Attesting Officer*

DONALD W. BANNER
*Commissioner of Patents and Trademarks*